United States Patent
Kim et al.

(10) Patent No.: US 7,659,807 B2
(45) Date of Patent: Feb. 9, 2010

(54) DEVICE AND METHOD FOR PROCESSING MULTIMEDIA BROADCAST-RELATED EVENTS IN PORTABLE TERMINAL

(75) Inventors: Jae-Ho Kim, Gumi-si (KR); Hyun-Ji Kim, Gumi-si (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 11/367,277

(22) Filed: Mar. 6, 2006

(65) Prior Publication Data

US 2006/0200746 A1 Sep. 7, 2006

(30) Foreign Application Priority Data

Mar. 4, 2005 (KR) .................... 10-2005-0018067
Jan. 4, 2006 (KR) .................... 10-2006-0000953

(51) Int. Cl.
G08B 1/08 (2006.01)
H04L 12/58 (2006.01)
H04M 3/42 (2006.01)

(52) U.S. Cl. ................ 340/309.16; 340/309.9; 340/7.55; 340/7.56; 455/412.1; 455/412.2; 455/425; 455/414.1; 455/550.1

(58) Field of Classification Search ............ 340/309.16, 340/309.9; 455/412.1, 412.2
See application file for complete search history.

(56) References Cited

U.S. PATENT DOCUMENTS

| | | | |
|---|---|---|---|
| 2003/0046421 A1* | 3/2003 | Horvitz et al. ............... 709/238 |
| 2003/0224762 A1* | 12/2003 | Lau et al. .................. 455/412.2 |
| 2004/0235531 A1* | 11/2004 | Anzawa et al. ............... 455/563 |
| 2005/0075069 A1* | 4/2005 | Higuchi ..................... 455/3.05 |
| 2005/0075097 A1* | 4/2005 | Lehikoinen et al. ......... 455/414.1 |
| 2005/0129125 A1* | 6/2005 | Cha et al. ............... 375/240.16 |
| 2005/0130631 A1* | 6/2005 | Maguire et al. ........... 455/414.1 |
| 2006/0073816 A1* | 4/2006 | Kim et al. ................. 455/414.1 |
| 2006/0135136 A1* | 6/2006 | Kim et al. ................. 455/414.1 |
| 2006/0135219 A1* | 6/2006 | Kim et al. ................... 455/573 |
| 2006/0135220 A1* | 6/2006 | Kim et al. ................... 455/573 |
| 2006/0148528 A1* | 7/2006 | Jung et al. ................... 455/566 |

(Continued)

FOREIGN PATENT DOCUMENTS

CN 1472670 A 2/2004

(Continued)

*Primary Examiner*—Donnie L Crosland
(74) *Attorney, Agent, or Firm*—Roylance, Abrams, Berdo and Goodman, LLP

(57) ABSTRACT

A device and method are provided for processing multimedia broadcast-related events in a portable terminal, and include a memory for storing character UI images according to multimedia broadcast-related events, an event collection section for collecting the multimedia broadcast-related events generated in the portable terminal and for generating event messages for discriminating the generated multimedia broadcast-related events, an agent control section including a plurality of specialists for processing the multimedia broadcast-related events, the agent control section determining specialists corresponding to the event messages, selecting and outputting character UI IDs corresponding to the multimedia broadcast-related events of the determined specialist, and processing feedback information on the corresponding events according to the feedback information of a user, and an agent expression section for outputting character images and texts which correspond to the multimedia broadcast-related events and the feedback information.

30 Claims, 9 Drawing Sheets

U.S. PATENT DOCUMENTS

| | | | |
|---|---|---|---|
| 2006/0161650 A1* | 7/2006 | Kim et al. | 709/224 |
| 2006/0166708 A1* | 7/2006 | Kim et al. | 455/573 |
| 2006/0190595 A1* | 8/2006 | Kim et al. | 709/224 |
| 2006/0234728 A1* | 10/2006 | Kim et al. | 455/461 |
| 2006/0234759 A1* | 10/2006 | Kim et al. | 455/550.1 |

FOREIGN PATENT DOCUMENTS

| | | |
|---|---|---|
| WO | WO 02/42959 A2 | 5/2002 |
| WO | WO 03/067859 A1 | 8/2003 |
| WO | WO 2004/068841 A2 | 8/2004 |

\* cited by examiner

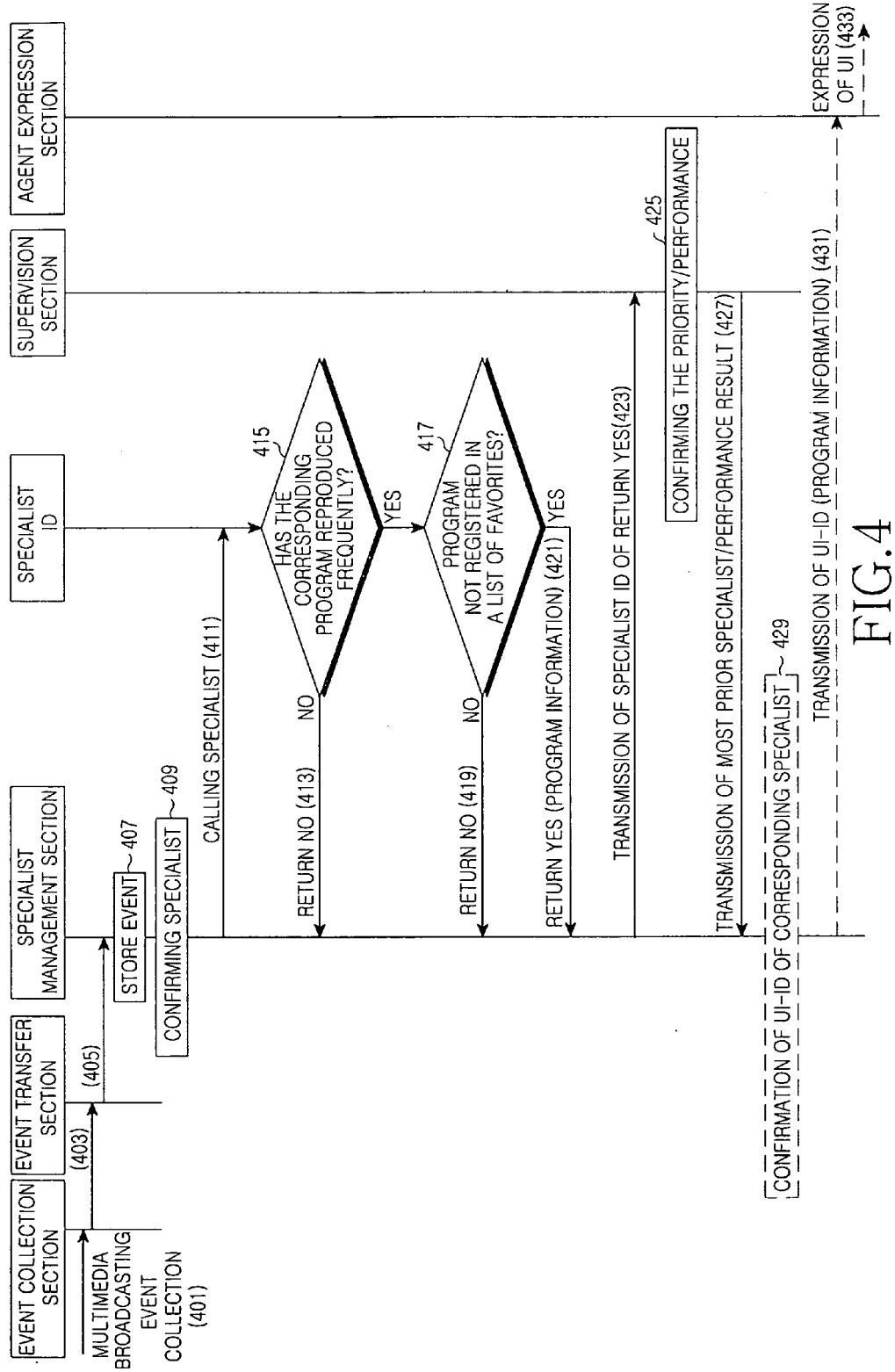

DEVICE AND METHOD FOR PROCESSING MULTIMEDIA BROADCAST-RELATED EVENTS IN PORTABLE TERMINAL

CROSS-REFERENCE TO RELATED APPLICATIONS

This application claims the benefit under 35 U.S.C. §119 (a) of Korean Patent Application No. 10-2005-0018067 entitled "DEVICE AND METHOD FOR PROCESSING MULTIMEDIA BROADCAST-RELATED EVENTS IN PORTABLE TERMINAL" filed with the Korean Intellectual Property Office on Mar. 4, 2005, and Korean Patent Application No. 10-2006-0000953 entitled "DEVICE AND METHOD FOR PROCESSING MULTIMEDIA BROADCAST-RELATED EVENTS IN PORTABLE TERMINAL" filed with the Korean Intellectual Property Office on Jan. 4, 2006, the entire disclosures of which are both incorporated herein by reference.

BACKGROUND OF THE INVENTION

1. Field of the Invention

The present invention relates to a device and method for processing multimedia broadcast-related events in a portable terminal. More particularly, the present invention relates to a device and method for informing a user of a start of a frequently watched multimedia broadcast program using a character agent function.

2. Description of the Related Art

In general, a portable terminal refers to a device which can be carried by a user, and its representative device is a mobile phone. Recently, the mobile phone has been developed so as to provide various additional functions as well as the original phone function. The mobile phone having the additional functions generally includes an LCD unit, and various display methods using character (avatar) image data have been developed in order to effectively display the additional functions and the state of the mobile phone.

A DMB (Digital Multimedia Broadcasting) phone, through which satellite/terrestrial broadcasting can be viewed, is an example of a mobile phone having such various additional functions. The DMB is a broadcasting service by which broadcasting contents are transmitted so that various multimedia broadcasting such as video, audio, and data can be heard or viewed through multi-channels using a portable or vehicular receiver, to which a reception antenna is mounted, outside a house or while moving. When watching the DMB through a mobile phone, a user can select a desired broadcasting channel while watching various broadcasting channel guides displayed on the screen of the mobile phone, and can watch a program selected by the user by displaying a program of the selected channel on a display unit.

A portable terminal including the multimedia receiving function receives CDM channel information related to the DMB service from a satellite. The received information includes EPG (Electronic Program Guide) information. Since the EPG information is the information related to broadcasting, and the table information of the EPG is continuously retransmitted by a predetermined interval, a user can receive the EPG information whenever the user uses the DMB service.

FIG. 1 is an exemplary view for illustrating a construction of an EPG. Referring to FIG. 1, the EPG comprises a BIT (Broadcaster Information Table) 101, an SDT (Service Description Table) 103, an EIT (Event Information Table) 105, and a TOT (Time Offset Table) 107. Here, the BIT 101 is used to transmit broadcasting information. Here, notices, the names of broadcasting companies, and the current channel lists are transmitted. Broadcast IDs are used to discriminate between different BITs 101. Further, the SDT 103 is used to transmit information of the channels. The information on channels comprises the names of the channels, URL information on the channels, whether the channels are free or require a fee, and the types of the channels (whether the channels are video channels or audio channels, or whether the channels can be recorded). The SDT 103 is discriminated from another SDT using service IDs. Further, the EIT 105 represents genre information of the programs. Here, the name of the program, URL information of the program, a period of time from the start of the program to the completion of the program, and the viewer rating transmitted and the genre information of the corresponding program is transmitted. The EIT 105 uses event IDs to discriminate different events. The TOT 107 represents information on the present time. The TOT 107 is necessary to compare the time of the currently performed program with the present time or to display the present time. As noted above, a user can be informed of various DMB channel information through the EPG information.

An exemplary portable terminal including the multimedia reception function comprises a broadcast reservation function as well as a multimedia broadcast program watching function. The broadcast reservation function comprises a broadcast start alarm reservation function and a broadcast record reservation function. The broadcast start alarm reservation function is a function for informing a user of the start of a broadcast when a broadcast program starts, provided by registering the broadcast start alarm reservation of the broadcast program in a broadcast reservation menu, while the user is watching the EPG information through the screen of the terminal.

However, according to the broadcast function, a user is required to set the reservation each time, and therefore, there are occasions in which the user does not reserve a favorite program either due to mistake, oversight or delay, and misses the start time of the program and can not watch the program. Further, the complexities involved with a user interface (UI) can make it inconvenient for a user to reserve a favorite program.

Accordingly, a need exists for a system and method for easily and effectively registering a favorite multimedia broadcast program.

SUMMARY OF THE INVENTION

Accordingly, embodiments of the present invention have been made to substantially solve the above-mentioned and other problems occurring in the prior art, and an object of embodiments of the present invention is to provide a device for registering a favorite multimedia broadcast program with a character agent function.

It is another object of embodiments of the present invention to provide a device and method for registering a favorite multimedia broadcast program under the control of a control unit of a portable terminal.

It is still another object of embodiments of the present invention to provide a method for informing a user of the start of a predetermined multimedia broadcast program by registering the multimedia broadcast program and genre.

In order to accomplish these and other objects, a device is provided for processing multimedia broadcast-related events in a portable terminal, the device comprising a memory for storing character UI images according to multimedia broadcast-related events, an event collection section for collecting the multimedia broadcast-related events generated in the portable terminal and for generating event messages for discriminating the generated multimedia broadcast-related events, an agent control section including a plurality of specialists for processing the multimedia broadcast-related events, the agent control section determining specialists corresponding to the event messages, selecting and outputting character UI IDs corresponding to the multimedia broadcast-related events of the determined specialist, and processing feedback information on the corresponding events according to the feedback information of a user, and an agent expression section for outputting character images and texts which correspond to the multimedia broadcast-related events and the feedback information.

According to another aspect of embodiments of the present invention, a method is provided for processing multimedia broadcast-related events in a portable terminal, the method comprising the steps of analyzing a multimedia broadcast program reproduction record if a multimedia broadcast-related event is generated, confirming whether a multimedia broadcast program applied to the generated event has been reproduced more than a critical number of times for a predetermined period of time, and expressing a character and text which recommend that a user should register the multimedia broadcast program in a list of Favorites if the multimedia broadcast program has been reproduced more than the critical number of times for the predetermined period of time.

According to another aspect of embodiments of the present invention, a method is provided for processing multimedia broadcast-related events in a portable terminal, the method comprising the steps of displaying a registration list of Favorites if an event for registering multimedia broadcast data in a list of Favorites is generated, expressing a character and text which confirm whether the multimedia broadcast data is to be registered in the list of Favorites in the type of selected genre if the genre item is selected from the registration list of Favorites, and expressing a character and text which confirm whether the multimedia broadcast data is to be registered in the list of Favorites in the type of selected program if the program item is selected from the registration list of Favorites.

According to another aspect of embodiments of the present invention, a method is provided for processing multimedia broadcast-related events in a portable terminal, the method comprising the steps of determining whether multimedia broadcast data has been registered, analyzing information on the registered multimedia broadcast data if the multimedia broadcast data has been registered, comparing time information on the multimedia broadcast data with the present time, extracting multimedia broadcast data having time information corresponding to the present time, and expressing a character and text which recommend that a user reproduce the extracted multimedia broadcast data.

BRIEF DESCRIPTION OF THE DRAWINGS

The above and other objects, features, and advantages of embodiments of the present invention will become more apparent from the following detailed description taken in conjunction with the accompanying drawings, in which:

FIG. 4 is a flowchart for illustrating an exemplary multimedia broadcast program registration operation of a character agent according to an embodiment of the present invention;

Throughout the drawings, like reference numerals will be understood to refer to like parts, components and structures.

DETAILED DESCRIPTION OF THE EXEMPLARY EMBODIMENTS

Figure 1:
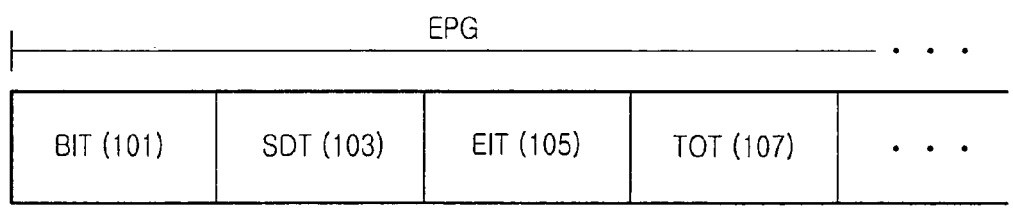
FIG. 1 is an exemplary view for illustrating a construction of an EPG that can be applied to an embodiment of the present invention.

Hereinafter, exemplary embodiments of the present invention will be described with reference to the accompanying drawings. In the drawings, same elements are noted by the same reference numerals. Further, in the following description, predetermined details such as the kind of events, examples of information required for expressing agents, and so forth, are represented for providing a better understanding of embodiments of the present invention.

Figure 2:
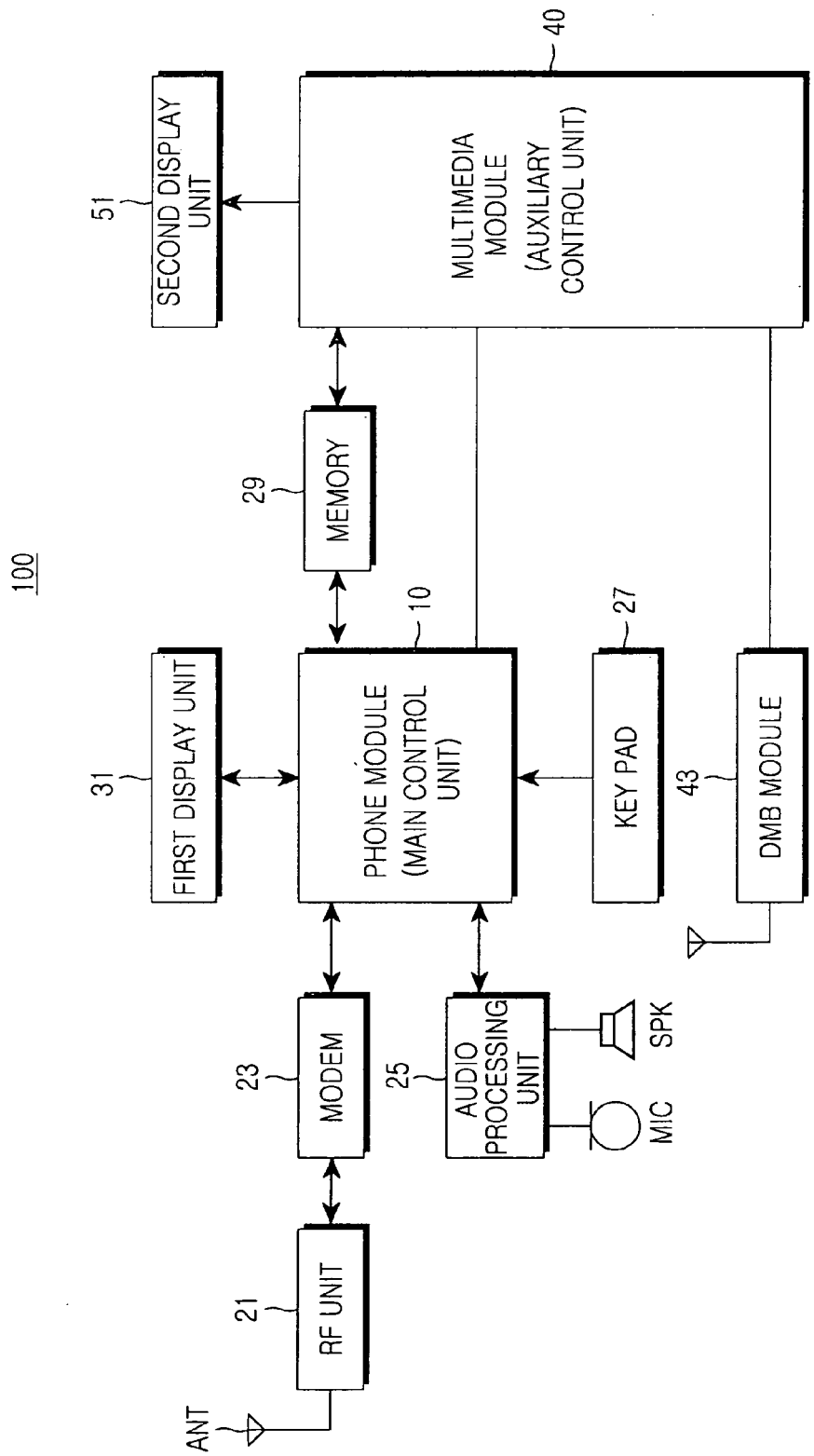
FIG. 2 is a block diagram for illustrating an exemplary portable terminal that is capable of receiving a digital multimedia broadcast according to an embodiment of the present invention.

FIG. 2 is a block diagram for illustrating an exemplary portable terminal that is capable of receiving a digital multimedia broadcast according to an embodiment of the present invention. The portable terminal 100 comprises a phone module 10, a radio frequency (RF) unit 21, a modem 23, an audio processing unit 25, a keypad 27, a memory 29, a first display unit 31, a multimedia module 40, a DMB module 43, and a second display unit 51. The portable terminal can further comprise at least one of an antenna ANT, a microphone MIC, and a speaker SPK.

In an exemplary embodiment of the present invention, it is assumed for example, that a first module (the phone module 10), a second module (the DMB module 43), and a third module (the multimedia module 40), are physically separated from one another, but all or some of the three modules can be comprised in a single chip.

Referring to FIG. 2, the RF unit 21 performs the communication functions of the portable terminal. The RF unit 21 comprise an RF transmitter for raising and amplifying frequencies of transmitted signals and an RF receiver for amplifying received signals with low noises and lowering frequencies of the received signals.

The modem 23 comprises a transmitter for encoding and modulating the transmitted signals and a receiver for decoding and demodulating the received signals. The audio processing unit 25 can comprise a codec, and the codec can itself comprise a data codec for processing packet data and so forth, and an audio codec for processing audio signals of voice and so forth. The audio processing unit 25 converts digital audio signals received in the modem 23 into analog signals through the audio codec to reproduce the analog signals, or converts analog audio signals generated in the microphone MIC into digital audio signals through the audio codec, and transmits the digital audio signals to the modem. The codec can be provided separately or can be provided in the phone module 10.

The keypad 27 comprises keys for inputting numbers and letters, and function keys for setting various functions. The keypad 27 can comprise digital multimedia broadcasting (DMB) mode keys, reproduction and completion keys, broadcasting channel selection keys, and so forth, according to embodiments of the present invention.

First and second display units 31 and 51, respectively, can include liquid crystal displays (LCDs). In this case, the first and second display units 31 and 51 can comprise memories for storing image data and LCD devices. Here, if the LCDs are equipped with touch screens, the keypad 27 and the LCDs can function as input sections. Further, the LCDs can include image data display sections on which image data is output. The first display unit 31 can display information related to general functions of the portable terminal having the mobile phone function, the DMB channel guide according to embodiments of the present invention, and so forth. The second display unit 51 can display image signals output from the multimedia module 40.

The memory 29 can store information related to the general functions of the portable terminal having the mobile phone function. Further, the memory 29 can store programs for controlling agent expressions with respect to the events generated according to an embodiment of the present invention. Furthermore, the memory 29 can store general programs for outputting an alarm message recommending that a user should watch a registered multimedia broadcast program at or before the start time of the registered multimedia broadcast program. The memory 29 can temporarily store data generated during the operation of the portable terminal. The memory 29 can store information on multimedia broadcasting services, channels, registered genres, and programs. Further, the memory 29 can comprise a character memory for storing character images for agent expressions.

The character memory can be operated as a file system, and indexes of the memory (or file system) can be provided with respect to the characters. The character memory can be comprised as various types in order to perform detailed elements of each character, that is, the operation, facial expression, and expression of an object. Namely, the character information stored in the character memory can be stored according to the types in which the agent expressions can be performed. Further, the memory 29 can include a text memory for storing text for agent expressions. The text memory can then further store corresponding contents according to the generated event or the feedback.

The phone module 10 can comprise an RF (Radio Frequency) transceiver section and a modem chip (for example, an MSM (Mobile Station Modem) 5500 as manufactured by Qualcomm Incorporated of San Diego, Calif.) section, and can transmit and receive conversation-related signals and generally control the functions of the portable terminal having a mobile phone function. Further, the phone module 10 collects events according to the operation of the portable terminal, and controls the agents according to the collected events to perform a function for expressing the processes and states of the events with the agents. Then, the phone module 10 can display the agent expressions by selecting a corresponding character and corresponding text from the memory 29. Further, the phone module 10 can display a character and text according to the feedback. Further, the phone module 10 can control the memory 29 in order to analyze information on the registered multimedia broadcast program and to examine the present time extract, and extract a multimedia broadcast program matched to the present time. Further, the phone module 10 can control the first display unit 31 in order to output an alarm message for recommending that a user should watch the extracted multimedia broadcast program. Further, if key input of a predetermined key is detected, the signals for the multimedia broadcast program reproduction are transmitted to the multimedia module 40.

The multimedia module 40 decodes the DMB data transmitted from the DMB module 43, outputs multimedia information (images, text, and audio) to be provided to a user, and transmits the generated DMB channel information to the phone module 10. The multimedia module 40 can be realized using a H.264 codec multimedia processor for example.

Hereinafter, an exemplary operation of a portable terminal will be described with reference to FIG. 2. If a user sets a transmission mode after performing a dialing operation through the keypad, the phone module 10 detects it, processes the dial information received through the modem 23, converts the dial information into RF signals through the RF unit 21, and outputs the RF signals. Thereafter, if a partner subscriber generates a response signal, the phone module 10 detects it through the RF unit 21 and the modem 23. A voice communication path is then formed through the audio processing unit 25, and the user performs the communication function. Further, in the case of a signal receiving mode, the phone module 10 detects the signal receiving mode through the modem 23, and generates a ring signal through the audio processing unit 25. Thereafter, if the user makes a response, the phone module 10 detects it. Then, a voice communication path is formed through the audio processing unit 25, and the user performs the communication function. In the signal transmitting and receiving modes, the voice communication mode is exemplified, but a data communication function, in which packet data and image data are communicated, can be performed in addition to the voice communication function. Further, in the case of a waiting mode or a text communication, the phone module 10 displays letter data which is processed through the modem 23, on the first display unit 31.

The above-mentioned portable terminal 100 performs a mobile phone function or a multimedia function according to the manipulation of a user through the keypad 27. The user can watch the DMB through the second display unit 51, and can perform the original function of the portable terminal or confirm the DMB channel guide through the first display unit 31.

Figure 3:
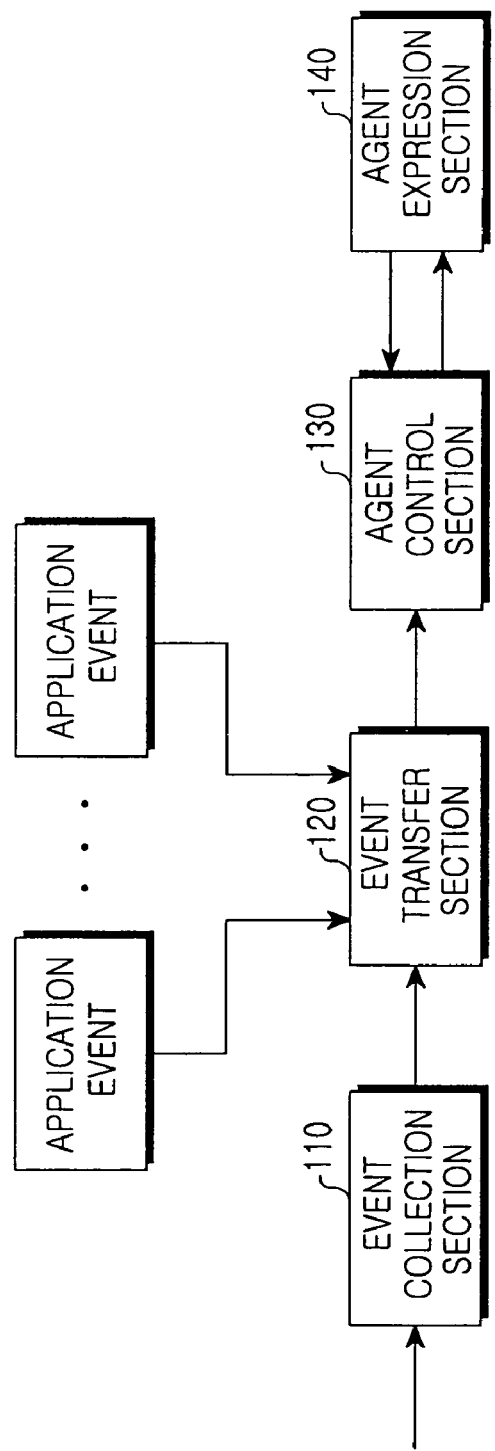
FIG. 3 is a block diagram for illustrating an exemplary control unit of a portable terminal according to an embodiment of the present invention.

FIG. 3 is a block diagram for illustrating an exemplary control unit of a portable terminal according to an embodiment of the present invention. The control unit comprises an event collection section 110, an event transfer section 120, an agent control section 130, and an agent expression section 140. Referring to FIG. 3, additional details of a control unit of a portable terminal as shown in FIG. 3 are disclosed in Korean Patent Application No. 10-2004-0078470, entitled "Intelligent Terminal Using an Agent of Artificial Intelligence", by Jae-ho Kim et al., the entire disclosure of which is incorporated herein by reference. In the following description, embodiments of the present invention will be described with reference to an exemplary control unit of the Korean Patent Application No. 10-2004-0078470. Embodiments of the present invention can be performed by controlling a single agent system in the control unit, without using function blocks, such as the event collection section 110, event transfer section 120, agent control section 130, and agent expression section 140, in the control unit.

Referring to FIG. 3, the event collection section 110 collects events generated in the portable terminal 100. Here, the events comprise a multimedia broadcast reproduction event, a multimedia broadcast completion event, and so forth, according to an embodiment of the present invention. Namely, the events collected in the event collection section 110 become the events defined in the portable terminal. The event collection section 110 produces event messages as information for discriminating the generated events, and provides the event messages to the event transfer section 120.

The event transfer section 120 transfers event messages provided by the event collection section 110 to corresponding clients. In the following description of embodiments of the present invention, the event transfer section 120 transfers the event messages only to the agent control section 130, but can transfer them to any number of sections requiring the transfer of the event messages. Further, the event transfer section 120 can receive user defining events, which are not defined in the portable terminal, and can transfer them to the agent control section 130, in addition to the events collected by the event collection section 110. Here, the user defining events can be referred to as application events. The application events may be events generated as a game, another application program, a web service program, and so forth.

If the agent control section 130 receives event messages from the event transfer section 120, it stores the event messages in an internal buffer, and analyzes the event messages and determines a UI so as to express corresponding character agents. Here, the event messages transferred from the event transfer section 120 may be events (events collected by the event collection section 110) of the portable terminal and application events. In the following description, the agent expressions of the events collected by the event collection section 110 will be emphasized.

The agent control section 130 comprises a plurality of specialists, and selects a specialist corresponding to the generated event in order to perform an agent control function. If the agent control section 130 receives an event, it informs a suitable specialist of the generation of the event and requests a UI of the agent expression section 140 so as to display the agent expression of the finally selected specialist. Further, the agent control section 130 processes feedback information of a user on the corresponding event, according to the feedback information of the user, which is received in the agent expression section 140.

The agent expression section 140 displays character expressions about the corresponding event, according to the agent UI information output from the agent control section 130. Then, the agent expression section 140 manages a plurality of character (avatar) Uls, which are to be displayed in the first display unit 31, and controls the portable terminal to display a corresponding character (avatar) according to the UI information required by the agent control section 130. Further, if a user generates feedback information in a state in which the character according to the generated event is displayed, the agent expression section 140 transmits the received feedback information to the agent control section 130. The agent control section 130 performs the agent control according to the user feedback information received from the agent expression section 140.

In the embodiment of FIG. 3, the event collection section 110 and the event transfer section 120 can be omitted. Here, the internal buffer of the agent control section 130 can also be referred to as a blackboard.

Hereinafter, an exemplary construction and operation of the agent control section 130 will be described in greater detail. The agent control section 130 comprises a plurality of specialists which are called according to events in order to perform preset specialized works and output the results, a blackboard for storing various information including information on the event messages, a supervision section for selecting one specialist in the case in which a plurality of specialists output valid results, a character (avatar) value storing section for storing values of the characters (avatars) according to the generated events, and a specialist management section which selects corresponding specialists from a list for specialists according to the events and controls the agent according to the event.

The specialists contribute to solve problems, and record a solution in a middle step in the blackboard with a specialty in a confined area, and represent a priority and user preference with respect to the middle step solution at the same time. The specialists grasp the state of the blackboard, request calculation of the priority and the user preference, and record the middle step solution in the blackboard.

The blackboard is a working environment in which the specialists communicate with one another and is also an information space. The advantages of the blackboard pattern are as follows. First, the specialists of different types can be easily integrated. Second, since the specialists have influence on one another, they can be developed so as to have independent modules. Third, they are elastic to various changes (an algorithm change of a specialist, addition of a new specialist, and so forth)

If more than two specialists are selected with respect to one event, the specialist management section requests the supervision section to select a specialist most relevant to the received event. Then, the supervision section analyzes the priority and the user preference according to the event, and selects the most relevant specialist.

The internal value of a character (avatar) is changed by various events generated in the portable terminal, the agent function, and the feedback of the user. In addition, the character (avatar) values influence various application events capable of using the character (avatar) values. Then, as the internal values of the characters (avatars) are changed, the character (avatar) interface is changed. Further, the characters (avatars) "grow up" over time, and this is the concept of the growth of the characters (avatars). The portable terminal according to embodiments of the present invention, introduces growth of characters (avatars) on the basis of an artificial intelligence agent system. For this, in embodiments of the present invention, since a user is suggested and informed of various actions on the basis of the events generated in the portable terminal, the user can use the terminal with more efficiency and fun. Further, the image of an avatar and the contents of text can be expressed differently according to the events and the feedback actions of the user, and then the value of the avatar is changed.

FIG. 4 is a flowchart for illustrating an exemplary multimedia broadcast program registration operation of a character agent according to an embodiment of the present invention.

Referring to FIG. 4, if a multimedia broadcast-related event is generated by a request from a user or a set broadcast time, the multimedia broadcast-related event is collected by the event collection section in step 401. The multimedia broadcast-related event may comprise a multimedia broadcast reproduction event and a multimedia broadcast completion event. Here, the generation of a multimedia broadcast completion event, by a request of a user or according to a set broadcast completion time, will be exemplified according to embodiments of the present invention.

The generated multimedia broadcast completion event is provided to the event transfer section in step 403, and the event transfer section provides the event to the specialist management section of the agent control section in step 405. The specialist management section stores the multimedia broadcast completion event to the blackboard in step 407, confirms specialists called from the internal specialist list during the multimedia broadcast event in step 409, and calls the specialists in step 411.

In the case in which a user has frequently reproduced and watched a predetermined multimedia broadcast program but the program is not registered (set in a predetermined group) in a list of Favorites, that is, a list for informing a user of the start of the program if the program starts, the called specialist ID recommends that a user should register the program. In step 415, the multimedia broadcast program reproduction (watching) records for the recent month are analyzed, and it is determined whether the corresponding multimedia broadcast program has been frequently (more than a critical number of times, for example, more than three times) reproduced (watched) recently (within a predetermined period of time, for example, within the past month). If the corresponding multimedia broadcast program has not been reproduced more than the critical number of times for the predetermined period of time, step 413 is performed to return a 'NO' signal to the specialist management section. If the corresponding multimedia broadcast program has been reproduced more than the critical number of times for the predetermined period of time, step 417 is performed to confirm if the corresponding multimedia broadcast program is not registered in the list of Favorites (that is, not registered in a predetermined group).

After the confirmation, if the corresponding multimedia broadcast program is registered in the list of Favorites, step 419 is performed to return a 'NO' signal to the specialist management section. Further, if the corresponding multimedia broadcast program is not registered in the list of Favorites, step 421 is performed to return a 'YES' signal to the specialist management section. Then, the information on the corresponding multimedia broadcast program can be returned. The information on the multimedia broadcast program can comprise information on the start time of the program, the period of time from the start of the program to the completion of the program, the title of the program, the genre of the program, and the number of times the program which will be reproduced.

If a return is performed by the called specialist in this way, the specialist management section provides the ID (for example, the Specialist ID in FIG. 4) of the specialist which returned a 'YES' signal in step 423 to the supervision section. The supervision section confirms the priority of the corresponding specialists or the performance of the corresponding specialist in the case in which one specialist returned the 'YES' signal in step 425, and transmits the confirmation result regarding the best specialist or the performance of the corresponding specialist to the specialist management section in step 427. Accordingly, the specialist management section confirms the preset UI-ID with respect to the ID of the best specialist or a specialist to perform in step 429, and transmits the UI-ID to the agent expression section in step 431. Then, the information on the corresponding multimedia broadcast program can be transmitted to the agent expression section, together with the UI-ID.

A character, text, and/or selection button list can be output and expressed so that contents recommending that a user should register the corresponding multimedia broadcast program in the list of Favorites (the list for informing a user of the start of the program if the corresponding multimedia program starts) can be included during the UI expression of the agent expression section, for example, during the expression of the UI corresponding to the specialist ID. Further, according to the feedback action of the user, a character with a delightful expression and/or text confirming that the corresponding multimedia broadcast program is registered in the list of Favorites can be expressed, or a character with a sad expression and/or text declining the registration of the corresponding multimedia broadcast program in the list of Favorites can be expressed in step 433. The expressed character and/or text can then disappear after the lapse of a predetermined period of time or by a key input for a predetermined key.

As described above, the multimedia broadcast program-related events can be processed with respect to the specialists of the character agent. Hereinafter, exemplary operations for processing the multimedia broadcast program-related events of the portable terminal will be described with reference to the accompanying drawings. In the following description, the main control unit 10, that is, the phone module, which does not provide the control unit with a function block, controls a single agent system, the memory 29, and the first and second display units 31 and 51, in order to perform embodiments of the present invention. Then, the memory 29 can collect and store the events generated in the portable terminal.

Figure 5A:
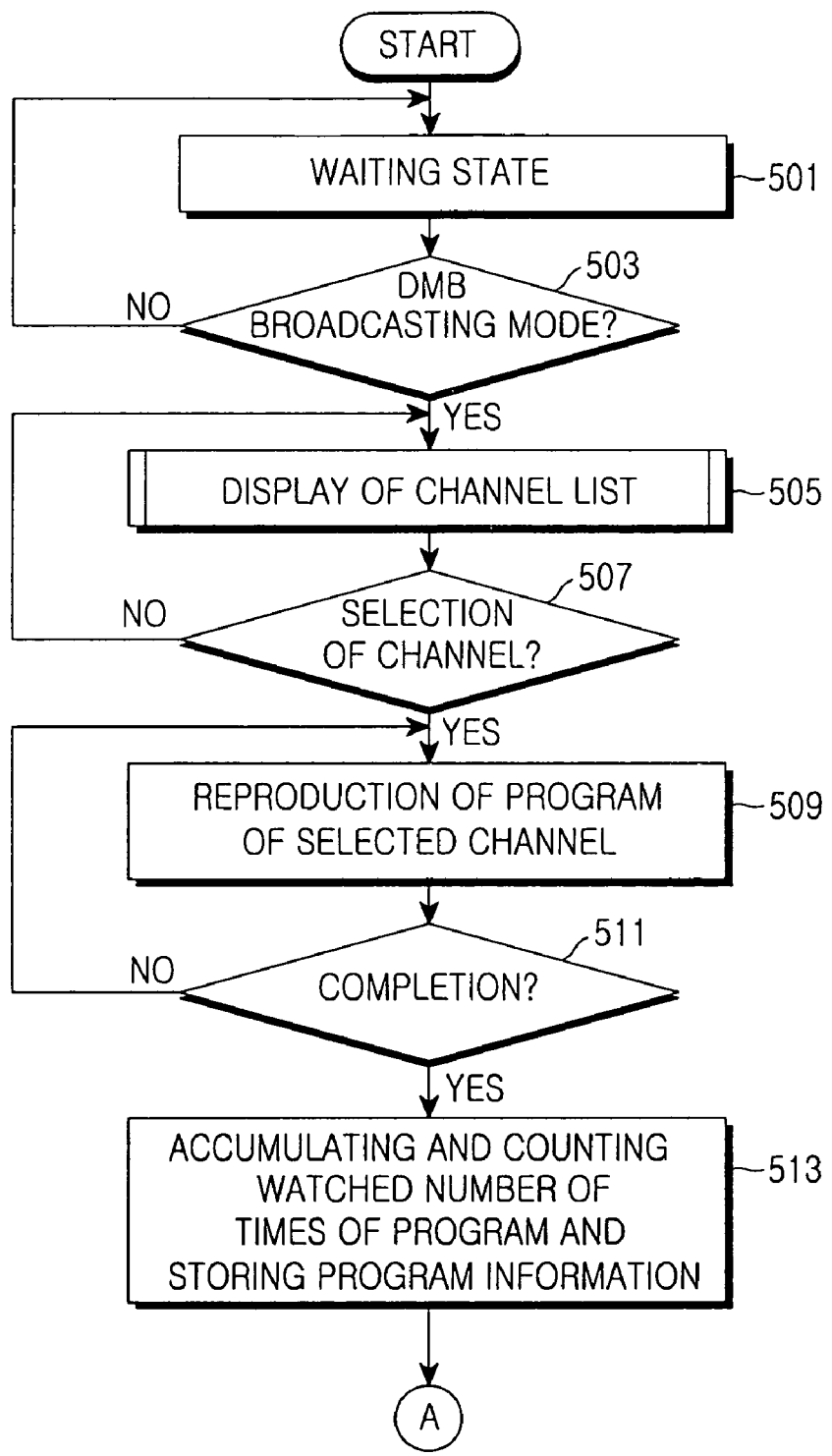
FIGS. 5A and 5B are flowcharts for illustrating an exemplary multimedia broadcast program registration operation of a portable terminal according to a first embodiment of the present invention.
Figure 5B:
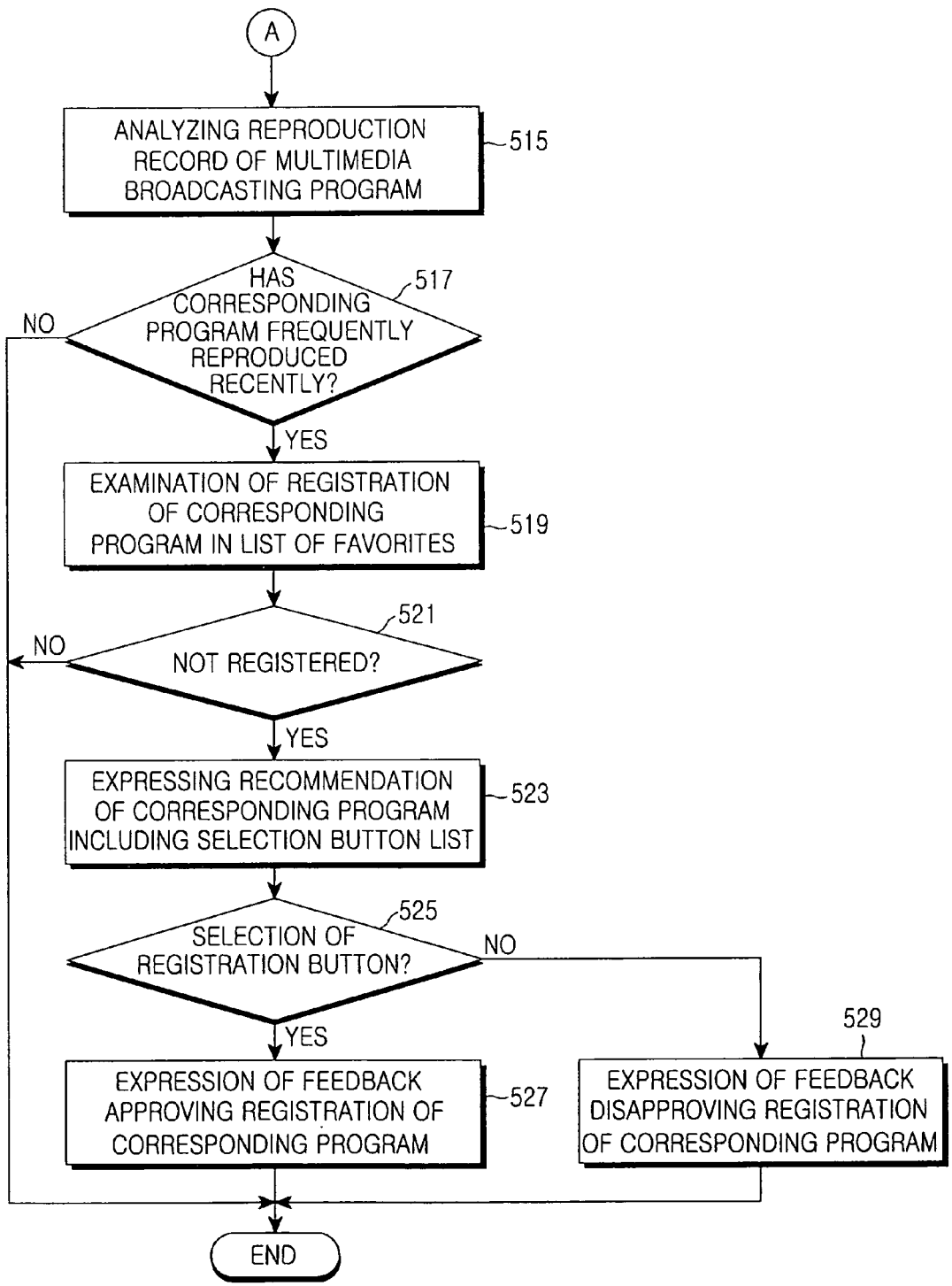

FIGS. 5A and 5B are flowcharts for illustrating an exemplary multimedia broadcast program registration operation of a portable terminal according to a first embodiment of the present invention. Hereinafter, the operation for registering a favorite multimedia broadcast program through a pattern will be described with reference to FIGS. 5A and 5B. If a user selects the DMB mode using the keypad 27 in step 501 which is a waiting state, the phone module 10 detects it in step 503 and informs the multimedia module 40 that the user selected the DMB mode. The multimedia module 40 once is informed that a user has selected the DMB mode, performs the initialization and receives EPG information. Then, the multimedia module 40 analyzes the EPG information data and stores them in the memory 29. Then, the multimedia module 40 transmits the generated EPG channel information to the phone module 10. Then, in step 505 the phone module 10 produces a DMB channel guide on the basis of the received EPG channel information, displays the DMB channel guide on the first display unit 31 as represented by way of example in Table 1 below, and controls the memory 29 to store the DMB channel guide. Here, the EPG information data comprises information on the channels, the genre of the multimedia broadcast programs, the title of the programs, the program URL, and the period of time from the start of the program to the completion of the program. Further, the DMB channel guide can be provided in a unit of a day, a week, or a month, and the same program is provided at the same time according to predetermined schedules.

TABLE 1

| DMB channel guide | |
|---|---|
| Channel | Program |
| 1 | MBC 9 news (News) |
| 2 | Gag concert (Entertainment) |
| 3 | Professional basketball (Sports) |
| 4 | Love song of winter (Drama) |
| 5 | VJ commando (Documentary) |

Figure 8:
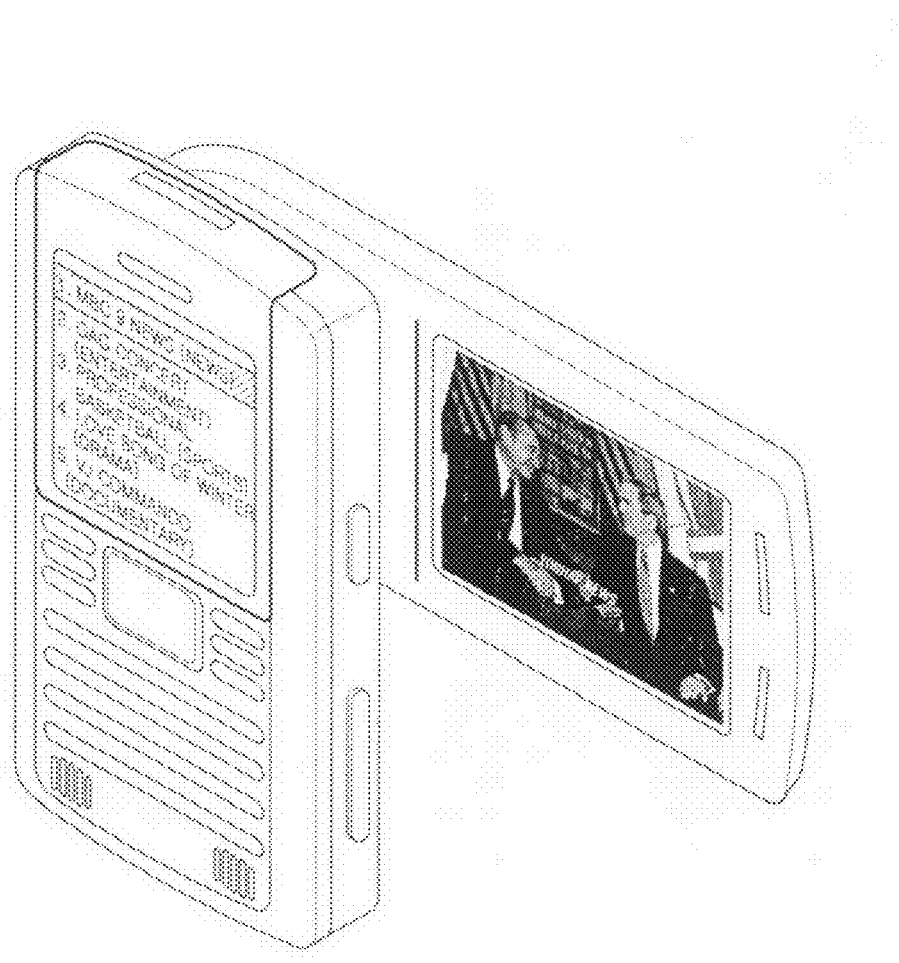
FIG. 8 is an exemplary view for illustrating a multimedia broadcast according to an embodiment of the present invention.

If a user selects a predetermined channel of the DMB channel guide represented in Table 1 using the keypad 27, the phone module 10 detects it in step 507, and informs the multimedia module 40 of the channel information selected by the user. The multimedia module 40, which has received the channel information selected by a user, displays the program of the DMB channel which has been selected by a user, as shown in FIG. 8, in step 509. Then, if a user performs a key input for the completion key using the keypad 27, the phone module 10 detects it in step 511 and proceeds with step 513. In step 513, the phone module 10 accumulates and counts the number of times the program is reproduced, and controls the memory 29 to store the program information. Here, the program information comprises information on the period time from the start time of the program to the completion time of the program, the title of the program, the genre of the program, and how many times the program has been reproduced.

The phone module 10 controls the memory 29 to analyze the multimedia broadcast program reproduction record in step 515, and proceeds with step 517. The multimedia broadcast program reproduction record stores information on the multimedia broadcast programs reproduced until the present time, and information on the multimedia broadcast programs reproduced for a predetermined period of time.

In step 517, the phone module 10 controls the memory 29 to determine whether the corresponding multimedia broadcast program has been frequently (more than a critical number of times, for example, more than three times) reproduced (watched) recently (within a predetermined period of time, for example, one month).

After the determination, if the corresponding multimedia broadcast program has not been reproduced more than a critical number of times within a predetermined period of time, the completion step is performed. If the corresponding multimedia broadcast program has been reproduced more than the critical number of times for the predetermined period of time, step 519 is performed. In step 519, the phone module 10 controls the memory to examine whether the corresponding multimedia broadcast program has not been registered (that is, not registered in a predetermined group) in the list of Favorites which is detected in step 521.

After the examination, if the corresponding multimedia broadcast program has been registered in the list of Favorites, the completion step is performed. If the corresponding multimedia broadcast program has not been registered in the list of Favorites, step 523 is performed. In step 523, the phone module 10 controls the memory 29 to extract the corresponding multimedia broadcast program information, and outputs and expresses a character, text, and/or selection button list which recommends that a user should register the corresponding multimedia broadcast program in the list of Favorites (that is, the list for informing a user of the start of the corresponding multimedia program).

Then, if a user selects the 'registration' button from the selection button list, the phone module 10 detects it in step 525 and proceeds with step 527 to express the feedback approving the registration of the corresponding multimedia broadcast program in the list of Favorites. The feedback approving the registration of the corresponding multimedia broadcast program in the list of Favorites is expressed with the information on the corresponding multimedia broadcast program and a character with a delightful expression and/or text which confirms the approval of the registration in the list of Favorites.

However, if a user selects the 'disapproval' button of the selection button list, the phone module 10 detects it in step 525 and proceeds with step 529 to express the feedback disapproving the registration of the corresponding multimedia broadcast program in the list of Favorites. The feedback disapproving the registration of the corresponding multimedia broadcast program in the list of Favorites is expressed with the information on the corresponding multimedia broadcast program and a character with a sad expression and/or text which declines the approval of the registration in the list of Favorites. Further, if the feedback disapproving the registration of the corresponding multimedia broadcast program in the list of Favorites is received, the reproduced (watched) number of times of the program, which is counted with the number of times accumulated, can be initialized, that is, set to zero, or the reproduced (watched) number of times can be counted reversely (that is, to decrease incrementally).

Further, the expressed character and/or text disappear after the lapse of a predetermined period of time or after a key input for a predetermined key. If the accumulated watched number of times of the corresponding multimedia broadcast program for a predetermined period of time is more than a preset critical number of times, the corresponding multimedia broadcast program can be automatically registered in the list of Favorites. Although the multimedia broadcast program is exemplified to this point, the program genre can be registered in substantially the same way.

Figure 6:
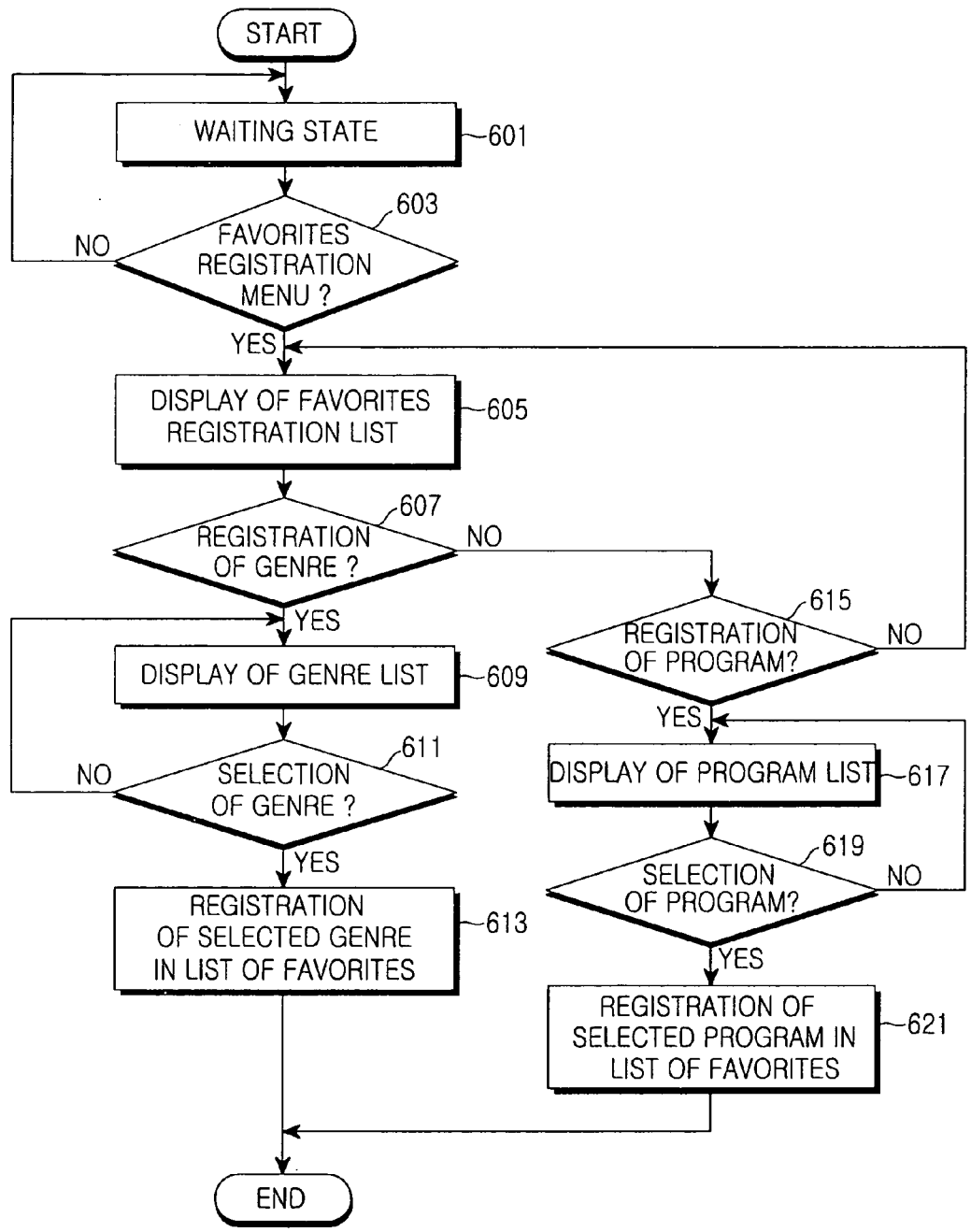
FIG. 6 is a flow chart for illustrating an exemplary multimedia broadcast program registration operation of a portable terminal according to a second embodiment of the present invention.

FIG. 6 is a flow chart for illustrating an exemplary multimedia broadcast program registration operation of a portable terminal according to a second embodiment of the present invention. Referring to FIG. 6, the operation for registering a favorite multimedia broadcast program or genre using a menu will be described. In the following description, the list of Favorites is a list for informing a user of the start of a multimedia broadcast program corresponding to a registered multimedia broadcast program or genre if the multimedia broadcast program or genre, which has been frequently watched, has been registered.

If a user selects a Favorites registration menu using the keypad 27 in step 601, which is a waiting state, the phone module 10 detects it in step 603 and generates a Favorites registration event for registering multimedia broadcast data (for example, a favorite multimedia broadcast program or genre) in the list of Favorites. The phone module 10 controls the memory 29 to display the favorites registration list as represented by way of example in Table 2 below, in step 605.

TABLE 2

| Favorites registration list | |
| --- | --- |
| 1 | Registration of genre |
| 2 | Registration of program |

If a user for example, selects 'Registration of genre' which is the No. 1 item of the Favorites registration list represented in Table 2 using the keypad 27, the phone module 10 detects it in step 607, and controls the memory 29 and the first display unit 31 to display a list of genres as represented by way of example in Table 3 below, in step 609.

TABLE 3

| List of genres | |
| --- | --- |
| 1 | News |
| 2 | Entertainment |
| 3 | Sports |
| 4 | Drama |
| 5 | Current issues |

If a user selects a corresponding genre, which is to be registered in the Favorites in the list of genres represented in Table 3 using the keypad 27, the phone module 10 detects it in step 611 and proceeds with step 613. In step 613, the phone module 10 controls the memory 29 and the first display unit 31 to extract the information on the selected genre, and outputs and expresses a character, text, and/or selection list so that they comprise contents in which it can be confirmed whether the multimedia broadcast data is to be registered in the list of Favorites in the type of the selected genre.

Thereafter, if a user selects the 'registration' button from the selection button list, the feedback approving the registration of the selected genre in the list of Favorites is expressed. The feedback approving the registration of the corresponding genre in the list of Favorites is expressed with the information on the corresponding genre and a character with a delightful expression and/or text which confirm the approval of the registration. However, if a user selects the 'cancel' button from the selection button list, the feedback canceling the registration of the selected genre in the list of Favorites is expressed. The feedback canceling the registration of the corresponding genre in the list of Favorites is expressed with the information on the corresponding genre and a character with a sad expression and/or text which confirm the cancellation of the registration.

Returning to Table 2, if a user for example, selects 'Registration of program' which is the No. 2 item of the Favorites registration list represented in Table 2 using the keypad 27, the phone module 10 detects it in step 615, and controls the memory 29 and the first display unit 31 to display a list of programs or the DMB channel guide as represented in Table 1 in step 617. Further, if a user selects a corresponding multimedia broadcast program, which is to be registered in the list of Favorites, in the multimedia broadcast program list using the keypad 27, the phone module 10 detects it in step 619 and proceeds with step 621. In step 621, the phone module 10 controls the memory 29 and the first display unit 31 to extract the information on the selected multimedia broadcast program, and outputs and expresses a character, text, and/or selection list so that they comprise contents in which it can be confirmed whether the multimedia broadcast data is to be registered in the list of Favorites in the type of the selected program.

Thereafter, if a user selects the 'registration' button from the selection button list, the feedback approving the registration of the selected multimedia broadcast program in the list of Favorites is expressed. The feedback approving the registration of the corresponding multimedia broadcast program in the list of Favorites is expressed with the information on the corresponding multimedia broadcast program and a character with a delightful expression and/or text which confirms the approval of the registration in the list of Favorites. However, if a user selects the 'cancel' button from the selection button list, the feedback canceling the registration of the selected multimedia broadcast program in the list of Favorites is expressed. The feedback canceling the registration of the corresponding multimedia broadcast program in the list of Favorites is expressed with the information on the corresponding multimedia broadcast program and a character with a sad expression and/or text which confirm the cancellation of the registration.

Figure 7:
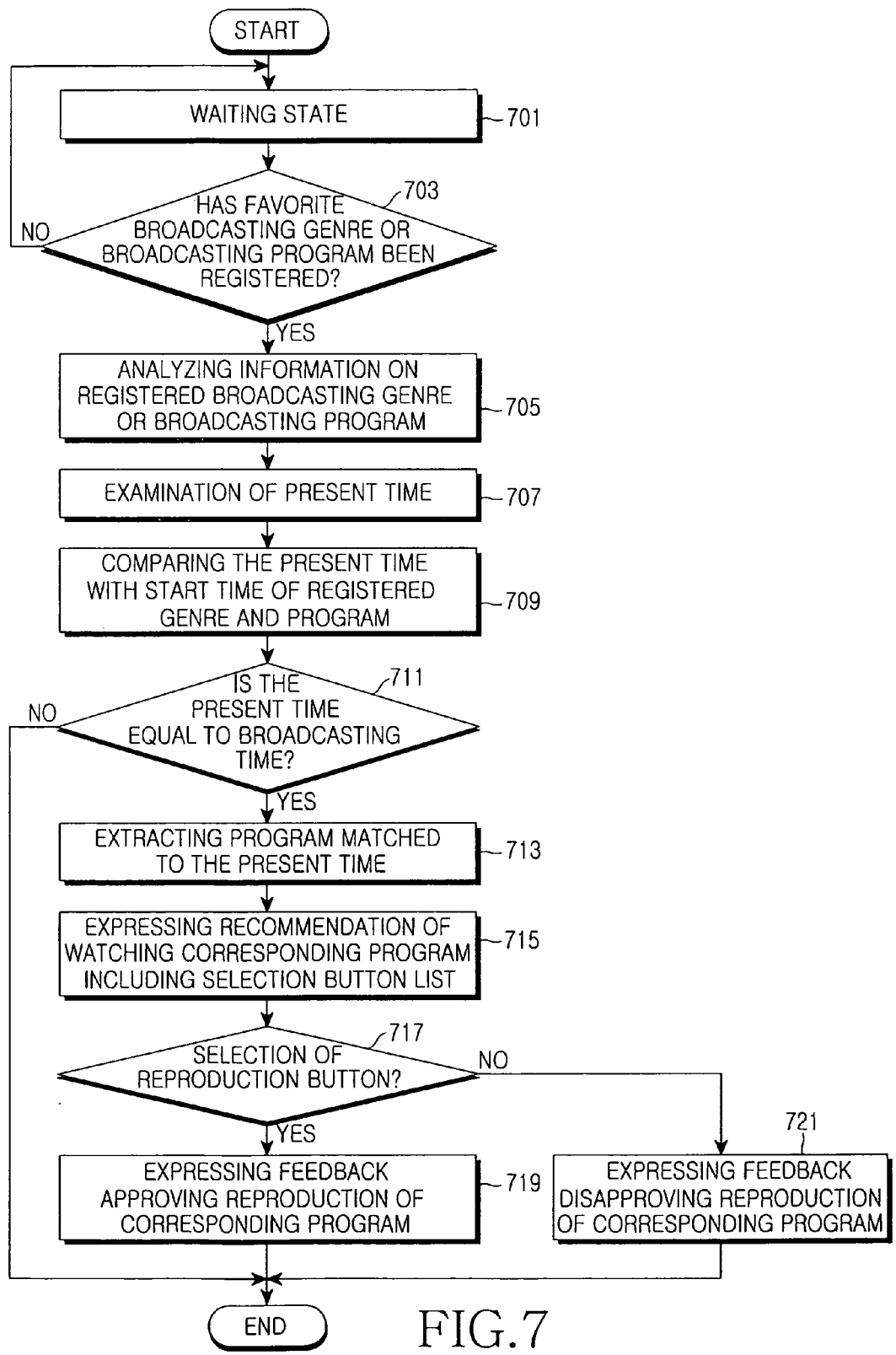
FIG. 7 is a flow chart for illustrating an exemplary operation for outputting a recommendation for watching a program registered according to an embodiment of the present invention.

FIG. 7 is a flow chart for illustrating an exemplary operation for outputting a recommendation to watch a program registered according to an embodiment of the present invention. Hereinafter, the operation for outputting a recommendation to watch a registered multimedia broadcast program and a multimedia broadcast program corresponding to a registered genre will be described with reference to FIG. 7.

The phone module 10 controls the memory 29 to examine whether the genre and/or the multimedia broadcast program, which are multimedia broadcast data, are registered in the list of Favorites in step 701, which is a waiting state. If the genre and/or the multimedia broadcast program are registered in the list of Favorites, the phone module 10 detects it in step 703 and proceeds with step 705 to analyze information on the registered genre and/or the multimedia program. Here, the information on the genre comprises the information on the multimedia program which belongs to the registered genre. The information on the multimedia broadcast program comprises information on the channel, the genre of the multimedia broadcast program, the title of the program, the program URL, and the period of time from the start of the program to the completion of the program.

The phone module 10 examines the present time provided from a timer or a base station in step 707 and proceeds with step 709. In step 709, the phone module 10 controls the memory 29 to compare the present time with the information on the start time of the multimedia broadcast program which belong to the analyzed genre and the information on the start time of the analyzed multimedia broadcast program. After the comparison, if there is a multimedia broadcast program having the information on the start time matched to the present time, the phone module 10 detects it in step 711, and controls the memory 29 to extract the multimedia broadcast program matched to the present time in step 713. Here, if there are plural multimedia broadcast programs matched to the present time, either all of them or the multimedia broadcast program having the highest priority can be extracted.

Further, the phone module 10 controls the memory 29 and the first display unit 31 to display an alarm message to recommend that a user should watch the extracted multimedia broadcast program at step 715. The alarm message is preferably expressed by outputting a character, text, and/or selection button list, so that the contents for recommending that a user watch the multimedia broadcast program are included. Here, the alarm message recommending that a user watch the multimedia broadcast program can be displayed before the start of the multimedia broadcast program (for example, one to five minutes before the start of the program) according to the setting.

Thereafter, if a user selects a 'reproduction (watching)' button from the selection button list, the phone module 10 detects it in step 717 and proceeds with step 719 to express the feedback approving the reproduction (watching) of the corresponding multimedia broadcast program. The feedback approving the reproduction (watching) of the corresponding multimedia broadcast program is expressed with a character with a delightful expression and/or text which confirms the information on the multimedia broadcast program and the approval of the reproduction (watching) of the corresponding multimedia broadcast program. Further, if the phone module 10 transmits the channel information on the corresponding multimedia broadcast program to the multimedia module 40, the multimedia module 40 controls the DMB module 43 to display the multimedia broadcast program on the second display unit 51 as shown in FIG. 8.

However, if a user selects the 'disapproval' button from the selection button list, the phone module 10 detects it in step 717 and proceeds with step 721 to express the feedback disapproving the reproduction (watching) of the corresponding multimedia broadcast program. The feedback disapproving the reproduction (watching) of the corresponding multimedia broadcast program is expressed with a character with a sad expression and/or text which confirm the information on the corresponding multimedia broadcast program and the disapproval of the reproduction (watching) of the corresponding multimedia broadcast program.

As described above, according to embodiments of the present invention, since the generation and processing of an event is expressed with a character UI corresponding to the event by adding a character agent function of a portable terminal, a multimedia broadcast-related event can be expressed with the character agent function. Further, by registering a favorite multimedia broadcast program and providing a method of informing a user of the start time of the registered multimedia broadcast program, embodiments of the present invention substantially solve the problem of not watching a program by mistake, by not reserving the program, or by missing the start time, thereby improving convenience for the user.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device for processing multimedia broadcast-related events in a portable terminal, the device comprising:
    a memory for storing character UI images according to multimedia broadcast-related events;
    an event collection section for collecting the multimedia broadcast-related events generated in the portable terminal, and for generating event messages for discriminating the generated multimedia broadcast-related events;
    an agent control section comprising at least one specialist for processing the multimedia broadcast-related events, the agent control section determining specialists corresponding to the event messages, selecting and outputting character UI IDs corresponding to the multimedia broadcast-related events of the determined specialist, and processing feedback information on the corresponding events according to the feedback information of a user; and
    an agent expression section for outputting character images and texts which correspond to the multimedia broadcast-related events and the feedback information.

2. A device according to claim 1, further comprising:
    an event transfer section for transferring the multimedia broadcast-related events collected in the event collection section to the agent control section.

3. A device according to claim 1, further comprising:
    a supervision section for selecting a specialist most relevant to an event in the case in which more than two specialists are selected with respect to the event.

4. A device according to claim 1, wherein the device further comprises:
    a specialist for determining whether a corresponding multimedia broadcast program has been reproduced more than a critical number of times for a predetermined period of time if a multimedia broadcast event is generated;
    a specialist for confirming whether the information on the corresponding multimedia broadcast program is registered in a list of Favorites if the corresponding multimedia broadcast program has been reproduced more than the critical number of times for the predetermined period of time; and
    a specialist for recommending that a user should register the information on the corresponding multimedia broadcast program in the list of Favorites if the information on the corresponding multimedia broadcast program is not registered in the list of Favorites.

5. A device according to claim 4, wherein the multimedia broadcast-related event comprises a multimedia broadcast program completion event.

6. A device according to claim 4, wherein the list of Favorites comprises a list for informing a user that the registered multimedia broadcast program is starting when the registered multimedia broadcast program starts, if the multimedia broadcast program reproduced more than the critical number of times for the predetermined period of time is registered.

7. A device according to claim 4, wherein the information on the multimedia broadcast program comprises information on the time, the title, the genre, and how many times the program has been reproduced.

8. A device according to claim 4, wherein the agent control section is configured to transfer the character UI ID and the information on the corresponding multimedia broadcast program according to the multimedia broadcast-related event of the specialist and control the portable terminal to output a character and text which recommend that a user should register the corresponding multimedia broadcast program in the list of Favorites.

9. A device according to claim 8, wherein the agent control section is configured to control the portable terminal to output a selection button list together with the character and text which recommend that the user should register the corresponding multimedia broadcast program in the list of Favorites and control the portable terminal to output a character and text which correspond to the feedback information generated by the selection button.

10. A device according to claim 9, wherein the expressed character and text are configured to disappear after a lapse of a predetermined period of time or by an input for a predetermined key.

11. A method for processing multimedia broadcast-related events in a portable terminal, the method comprising the steps of:
    analyzing a multimedia broadcast program reproduction record if a multimedia broadcast-related event is generated;
    confirming whether a multimedia broadcast program applied to the generated event has been reproduced more than a critical number of times for a predetermined period of time; and
    expressing a character and text which recommend that a user should register the multimedia broadcast program in a list of Favorites if the multimedia broadcast program has been reproduced more than the critical number of times for the predetermined period of time.

12. A method according to claim 11, further comprising the step of:
    accumulating and counting a reproduced number of times of the multimedia broadcast program applied to the generated event; and
    storing the information on the reproduced multimedia broadcast program in the multimedia broadcast program reproduction record if the multimedia broadcast-related event is generated.

13. A method according to claim 11, further comprising the steps of:
    expressing a selection button list, together with a character and text which recommend that a user should register the multimedia broadcast program;
    expressing a character and text which approve registration of the multimedia broadcast program if a button approving the registration of multimedia broadcast program is selected from the selection button list; and expressing a character and text which disapprove the registration of the multimedia broadcast program if a button disapproving the registration of the multimedia broadcast program is selected from the selection button list.

14. A method according to claim 13, wherein the expressed character and text are configured to disappear after a lapse of a predetermined period of time or by an input for a predetermined key.

15. A method according to claim 13, further comprising the step of:

initializing the reproduced number of times of the corresponding multimedia broadcast program if the button for disapproving the registration of the multimedia broadcast program is selected.

16. A method according to claim 11, further comprising the step of:

storing information on the multimedia broadcast programs reproduced until the present time and information on the multimedia broadcast program reproduced for a predetermined period of time in the multimedia broadcast program reproduction record.

17. A method according to claim 11, wherein the list of Favorites comprises a list for informing a user that the registered multimedia broadcast program is starting when the registered multimedia broadcast program starts, if the multimedia broadcast program reproduced more than the critical number of times for the predetermined period of time is registered.

18. A method according to claim 12, wherein the information on the multimedia broadcast program comprises information on the start time of the program, the period of time from the start to the completion of the program, the title of the program, the genre of the program, and the reproduced number of times of the program.

19. A method for processing multimedia broadcast-related events in a portable terminal, the method comprising the steps of:

displaying a registration list of Favorites if an event for registering multimedia broadcast data in a list of Favorites is generated;

expressing a character and text which confirm whether the multimedia broadcast data is to be registered in the list of Favorites in the type of the selected genre if the genre item is selected from the registration list of Favorites; and expressing a character and text which confirm whether the multimedia broadcast data is to be registered in the list of Favorites in the type of the selected program if the program item is selected from the registration list of Favorites.

20. A method according to claim 19, further comprising the steps of:

displaying a list of genres if a genre item is selected from the registration list of Favorites; and extracting information on a selected genre if the corresponding genre is selected from the displayed list of genres.

21. A method according to claim 19, further comprising the steps of:

displaying a multimedia broadcast program list if a program item is selected from the registration list of Favorites; and extracting information on a selected program if the program is selected from the displayed multimedia broadcast program list.

22. A method according to claim 19, further comprising the steps of:

expressing a selection button list, together with a character and text which confirm whether the multimedia broadcast data is to be registered in the list of Favorites in the type of the selected genre;

expressing a character and text which approve the registration of the selected genre if a button approving the registration of the selected genre is selected from the selection button list; and expressing a character and text which cancel the registration of the selected genre if a button canceling the registration of the selected genre is selected from the selection button list.

23. A method according to claim 19, further comprising the steps of:

expressing a selection button list, together with a character and text which confirm whether the multimedia broadcast data is to be registered in the list of Favorites in the type of the selected program;

expressing a character and text which approve the registration of the selected multimedia broadcast program if a button approving the registration of the selected multimedia broadcast program is selected from the selection button list; and expressing a character and text which cancel the registration of the selected multimedia broadcast program if a button canceling the registration of the selected multimedia broadcast program is selected from the selection button list.

24. A method according to claim 19, wherein the list of Favorites comprises a list for informing a user that the registered multimedia broadcast program or the registered genre is starting when the registered multimedia broadcast program or the registered genre starts, if the favorite multimedia broadcast program or genre is registered.

25. A method for processing multimedia broadcast-related events in a portable terminal, the method comprising the steps of:

determining whether multimedia broadcast data has been registered;

analyzing information on the registered multimedia broadcast data if the multimedia broadcast data has been registered;

comparing time information on the multimedia broadcast data with the present time;

extracting multimedia broadcast data having time information corresponding to the present time; and expressing a character and text which recommend that a user should reproduce the extracted multimedia broadcast data.

26. A method according to claim 25, further comprising the steps of:

expressing a selection button list, together with a character and text which recommend that a user should reproduce the multimedia broadcast data;

expressing a character and text which approve reproduction of the multimedia broadcast data if a button approving the reproduction of the multimedia broadcast data is selected from the selection button list; and expressing a character and text which disapprove reproduction of the multimedia broadcast data if a button disapproving the reproduction of the multimedia broadcast data is selected from the selection button list.

27. A method according to claim 25, wherein the multimedia broadcast data comprises a multimedia broadcast program and a genre.

28. A method according to claim 25, wherein, if there is plural multimedia broadcast data having time information corresponding to the present time, the multimedia broadcast data having the highest priority is extracted.

29. A method according to claim 25, wherein the character and text which recommend the reproduction of the extracted multimedia broadcast data are expressed before the multimedia broadcast data starts.

30. A method according to claim 26, further comprising the step of:
 reproducing the multimedia broadcast data after expressing the character and text approving the reproduction of the multimedia broadcast data.

* * * * *

UNITED STATES PATENT AND TRADEMARK OFFICE
CERTIFICATE OF CORRECTION

PATENT NO. : 7,659,807 B2  Page 1 of 1
APPLICATION NO. : 11/367277
DATED : February 9, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Twenty-eighth Day of December, 2010

David J. Kappos
*Director of the United States Patent and Trademark Office*